United States Patent
Urata et al.

(10) Patent No.: US 10,246,361 B2
(45) Date of Patent: Apr. 2, 2019

(54) METHOD FOR MANUFACTURING MOLTEN GLASS, METHOD FOR MANUFACTURING GLASS PRODUCT, AND DEVICE FOR MANUFACTURING MOLTEN GLASS

(71) Applicant: AGC Inc., Chiyoda-ku (JP)

(72) Inventors: Shingo Urata, Chiyoda-ku (JP);
Takashi Enomoto, Chiyoda-ku (JP);
Kazuhiro Suzuki, Chiyoda-ku (JP);
Kensuke Nagai, Chiyoda-ku (JP)

(73) Assignee: AGC Inc., Chiyoda-ku (JP)

(*) Notice: Subject to any disclaimer, the term of this patent is extended or adjusted under 35 U.S.C. 154(b) by 41 days.

(21) Appl. No.: 15/370,424

(22) Filed: Dec. 6, 2016

(65) Prior Publication Data
US 2017/0081232 A1 Mar. 23, 2017

Related U.S. Application Data

(63) Continuation of application No. PCT/JP2015/066763, filed on Jun. 10, 2015.

(30) Foreign Application Priority Data

Jun. 12, 2014 (JP) .................................. 2014-121577

(51) Int. Cl.
*C03B 5/193* (2006.01)
*C03B 5/237* (2006.01)
(Continued)

(52) U.S. Cl.
CPC ............ *C03B 5/193* (2013.01); *C03B 5/2252* (2013.01); *C03B 5/237* (2013.01); *C03B 5/235* (2013.01); *C03B 5/2356* (2013.01); *Y02P 40/535* (2015.11)

(58) Field of Classification Search
CPC ........ C03B 5/193; C03B 5/2252; C03B 5/235
See application file for complete search history.

(56) References Cited

U.S. PATENT DOCUMENTS

| | | |
|---|---|---|
| 5,766,296 A | 6/1998 | Moreau |
| 6,871,514 B2 | 3/2005 | Muschik et al. |

(Continued)

FOREIGN PATENT DOCUMENTS

| | | |
|---|---|---|
| JP | 53-102916 | 9/1978 |
| JP | 2004-526656 | 9/2004 |

(Continued)

OTHER PUBLICATIONS

International Search Report dated Jul. 28, 2015 in PCT/JP2015/066763, filed on Jun. 10, 2015.

*Primary Examiner* — James Sanders
(74) *Attorney, Agent, or Firm* — Oblon, McClelland, Maier & Neustadt, L.L.P.

(57) ABSTRACT

There is provided a process for producing molten glass, which is capable of easily increasing the $H_2O$ content in glass melt with excessive generation of convection of the glass melt being reduced.

One mode of the process for producing molten glass according to the present invention is characterized to include a material melting step for melting a raw glass material in a melting furnace to prepare glass melt; a water-molecules supply step for supplying a water-molecules supply gas into the glass melt flowing from an upstream end of the melting furnace toward a downstream end of the melting furnace; and a refining step for degassing, under a reduced pressure atmosphere, the glass melt flowing out of the downstream end; wherein a position where the water-molecules supply gas is supplied in the water-molecules supply step includes a first position and a second position from downstream to upstream in a flowing direction of the glass melt in this (Continued)

order; the first position is a position away from both of the upstream end and the downstream end; and the second position is a position closer to the upstream end than a center of a distance between the upstream end and the first position in the flowing direction of the glass melt.

13 Claims, 7 Drawing Sheets

(51) Int. Cl.
*C03B 5/225* (2006.01)
*C03B 5/235* (2006.01)

(56) References Cited

U.S. PATENT DOCUMENTS

| | | | |
|---|---|---|---|
| 2002/0035855 A1* | 3/2002 | Romer | C03B 5/193 65/134.4 |
| 2002/0121113 A1* | 9/2002 | Gohlke | C03B 5/193 65/134.4 |
| 2002/0166343 A1 | 11/2002 | LeBlanc | |

FOREIGN PATENT DOCUMENTS

| | | |
|---|---|---|
| JP | 2009-7251 | 1/2009 |
| WO | WO 2007/111079 A1 | 10/2007 |
| WO | WO 2009/125750 A1 | 10/2009 |
| WO | WO 2013/094313 A1 | 6/2013 |

* cited by examiner

METHOD FOR MANUFACTURING MOLTEN GLASS, METHOD FOR MANUFACTURING GLASS PRODUCT, AND DEVICE FOR MANUFACTURING MOLTEN GLASS

This application is a continuation of PCT Application No. PCT/JP2015/066763 filed on Jun. 10, 2015, which is based upon and claims the benefit of priority from Japanese Patent Application No. 2014-121577 filed on Jun. 12, 2014. The contents of those applications are incorporated herein by reference in their entireties.

TECHNICAL FIELD

The present invention relates to a process for producing molten glass, a process for producing a glass product and an apparatus for producing the molten glass.

BACKGROUND ART

It has been known to dispose a bubbler in a melting furnace for the purpose of generating convection in glass melt as disclosed in e.g. Patent Documents 1 to 3 identified below.

PRIOR ART DOCUMENTS

Patent Documents

Patent Document 1: WO2009-125750
Patent Document 2: JP-A-S53-102916
Patent Document 3: U.S. Pat. No. 6,871,514
Patent Document 4: WO2007-111079

DISCLOSURE OF INVENTION

Technical Problem

It has been known to increase the $H_2O$ content in glass melt to accelerate vacuum degassing as disclosed in e.g. Patent Document 4. As the method for increasing the $H_2O$ content in glass melt, e.g. Patent Document 2 discloses that a bubbler is disposed in a melting furnace to introduce $H_2O$ into glass melt.

When the ejection amount of gas ejected from a bubbler is too much, glass melt is, however, subjected to excessive generation of convection in the melting furnace in some cases. This results in a problem that bubbles in gas ejected from the bubbler come into a refiner, and the problem that the bottom of the melting furnace is excessively heated to deteriorate the melting furnace.

One mode of the present invention has been made in consideration of the above-described problems. It is an object of the present invention to provide a process for producing molten glass, which is capable of readily increasing the $H_2O$ content in glass melt with excessive generation of convection of the glass melt being reduced, a process for producing a glass product by use of the process for producing molten glass, and an apparatus for producing the molten glass.

Solution to Problem

One mode of the process for producing molten glass according to the present invention is characterized to include a material melting step for melting a raw glass material in a melting furnace to prepare glass melt; a water-molecules supply step for supplying a water-molecules supply gas into the glass melt flowing from an upstream end of the melting furnace toward a downstream end of the melting furnace; and a refining step for degassing, under a reduced pressure atmosphere, the glass melt flowing out of the downstream end; wherein a position where the water-molecules supply gas is supplied in the water-molecules supply step includes a first position and a second position from downstream toward upstream in a flowing direction of the glass melt in this order; the first position is a position away from both of the upstream end and the downstream end; and the second position is a position closer to the upstream end than a center of a distance between the upstream end and the first position in the flowing direction of the glass melt.

The process may be a process wherein the water-molecules supply gas supplied at the second position has a smaller floating force than the water-molecules supply gas supplied at the first position.

The process may be a process wherein the water-molecules supply gas supplied at each of the first position and the second position is ejected as bubbles by a bubbler; and the bubbles of the water-molecules supply gas supplied at the second position have a smaller bubble diameter than the bubbles of the water-molecules supply gas supplied at the first position.

The process may be a process wherein the water-molecules supply gas supplied at the second position has a smaller supply amount than the water-molecules supply gas supplied at the first position.

The process may be a process wherein no water-molecules supply gas is supplied between the first position and the center in the water-molecules supply step.

The process may be a process wherein no water-molecules supply gas is supplied between the first position and the downstream end in the water-molecules supply step.

The process may be a process wherein the first position is present close to a position where the glass melt has a highest temperature in the flowing direction of the glass melt and which is present in a portion of the glass melt close to the bottom of the melting furnace.

The process may be a process wherein the second position is present in a portion of the glass melt close to the bottom of the melting furnace.

The process may be a process wherein the second position is present in a portion of the glass melt close to a glass level in the water-molecules supply step.

The process may be a process wherein steam is supplied in a space in contact with the glass melt in the water-molecules supply step.

The process may be a process wherein the raw glass material is molten by air combustion in the material melting step.

The process may be a process wherein the melting furnace is equipped with a burner for ejecting combustion flame into the melting furnace; the burner is supplied with a combustion gas through a regenerative furnace for storing heat in the melting furnace; and steam is supplied into the regenerative furnace in the material melting step.

The process may be a process wherein the water-molecules supply gas contains a gas having hydrogen atoms therein.

One mode of the process for producing a glass product according to the present invention is characterized to include a step for preparing molten glass by use of the above-mentioned molten glass producing process; and a forming step for forming the molten glass to produce a glass product.

One mode of the apparatus for producing molten glass according to the present invention is characterized to include a melting furnace configured to melt raw glass material to prepare glass melt; a bubbler disposed in the melting furnace and having a supply port configured to supply a water-molecules supply gas in the glass melt flowing from an upstream end of the melting furnace toward a downstream end of the melting furnace; and a vacuum degassing apparatus configured to degas, under a reduced pressure atmosphere, the glass melt flowing out of the downstream end; wherein the bubbler includes a first bubbler and a second bubbler from downstream to upstream in a flowing direction of the glass melt in this order, the first bubbler having a first ejection port to supply the water-molecules supply, and the second bubbler having a second ejection port to supply the water-molecules supply; the first ejection port is disposed at a first position away from both of the upstream end and the downstream end; and the second ejection port is disposed at a second position closer to the upstream end than a center of a distance between the upstream end and the first position in the flowing direction of the glass melt.

Advantages Effects of Invention

One mode of the present invention provides a process for producing molten glass, which is capable of readily increasing the $H_2O$ content in glass melt being with excessive generation of convection of the glass melt being reduced, a process for producing a glass product by use of the process for producing molten glass, and an apparatus for producing the molten glass.

DESCRIPTION OF EMBODIMENTS

Now, a process for producing molten glass, a process for producing a glass product, and an apparatus for producing the molten glass will be described in reference to the accompanying drawings.

It is to be understood that the present invention is not limited to the embodiments described later and is susceptible of various changes and modifications without departing from the spirit and scope of the claimed invention. The accompanying drawings are depicted so as to be different from an actual structure in terms of reduced scale, number etc. for easy understanding, in some cases.

Figure 1:
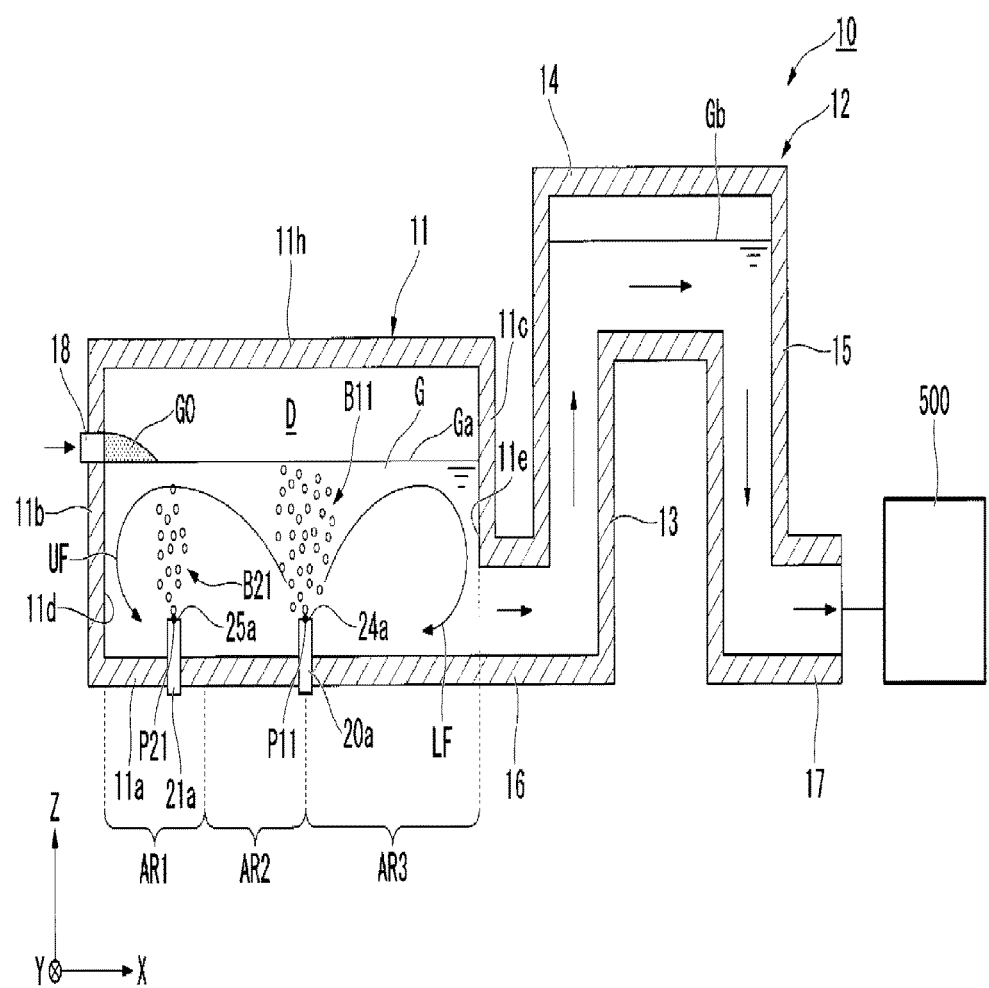
FIG. 1 is a schematic view showing the molten glass producing apparatus according to an embodiment of the present invention.

In the drawings, as required, an XYZ coordinate system is shown as a three-dimensional orthogonal coordinate system such that the Z-axis direction is a vertical direction, the X-axis direction is a longwise direction of the melting furnace 11 shown in FIG. 1 and the Y-axis direction is a width direction of the melting furnace 11. The longwise direction of the melting furnace 11 is the crosswise direction in FIG. 1. The width direction of the melting furnace 11 is the vertical direction in FIG. 3.

In Description, the wordings "upstream" and "downstream" are defined in terms of the flowing direction of glass melt in the apparatus for producing the molten glass.

In Description, the phrase "the flowing direction of glass melt" means a dominant direction in the flowing direction of glass melt G in the entire apparatus for producing the molten glass 10 but does not mean the flowing direction of convection generated in the melting furnace 11, unless otherwise specified. In other words, the flowing direction of the glass melt G in the melting furnace 11 is a positive (plus) direction in the X-axis in the embodiments.

<Apparatus for Producing Molten Glass>

First, the molten glass producing apparatus 10 according to an embodiment of the present invention will be described.

Figure 2:
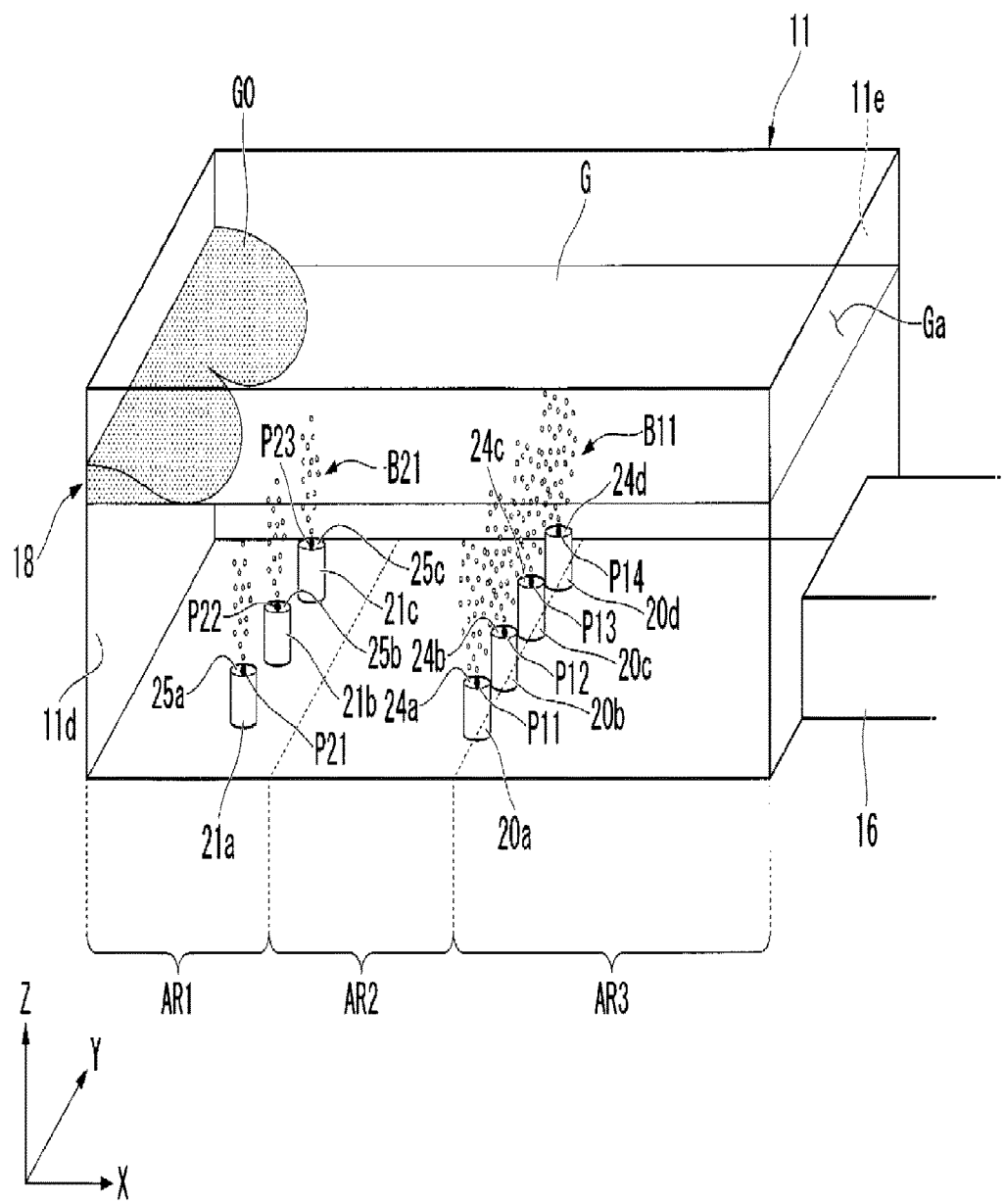
FIG. 2 is a perspective view showing a portion of the molten glass producing apparatus according to the embodiment.
Figure 3:
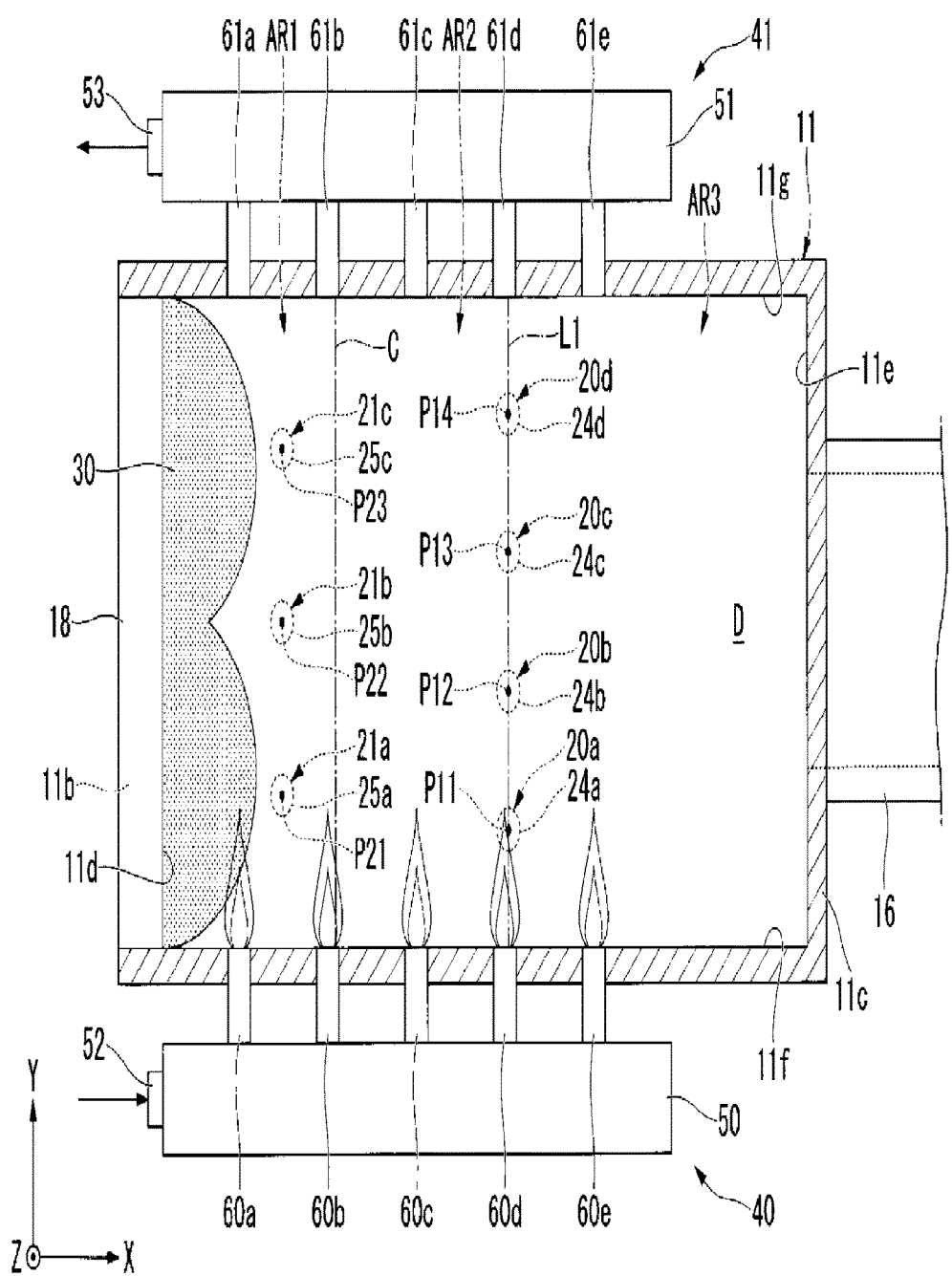
FIG. 3 is a plan view showing a portion of the molten glass producing apparatus according to the embodiment.

As shown in FIGS. 1 and 2, the molten glass producing apparatus 10 according to the embodiment includes a melting furnace 11, first bubblers 20a, 20b, 20c and 20d, second bubblers 21a, 21b and 21c, and a vacuum degassing apparatus 12. The molten glass producing apparatus 10 further includes a first heating system 40 and a second heating system 41 as shown in FIG. 3. Downstream the molten glass producing apparatus 10 is provided a forming apparatus 500.

[Melting Furnace]

In the embodiment, the melting furnace 11 is made of refractory bricks. The melting furnace 11 has an upstream wall 11b formed with a raw glass material supply port 18 which opens at an inner side surface 11d of the upstream wall 11b. Inside the melting furnace 11, a raw glass material G0 introduced from the raw glass material supply port 18 is molten to prepare glass melt G. The resulting glass melt G flows from the inner side surface 11d of the upstream wall 11b toward an inner surface 11e of a downstream wall 11c in the melting furnace 11.

It should be noted that the inner side surface 11d of the upstream wall 11b corresponds to the upstream end defined in Claims, and that the inner surface 11e of the downstream wall 11c corresponds to the downstream end defined in Claims.

On a side of a glass level Ga of the glass melt G close to a top wall 11h of the melting furnace, in other words, on an upper side of the glass level in a vertical direction, a space D is formed, being surrounded by the glass level Ga of the glass melt G and the inner wall surfaces of the melting furnace 11. The melting furnace 11 has a bottom 11a equipped with the first bubblers 20a-20d and the second bubblers 21a-21c.

[First Bubblers]

The first bubblers 20a-20d are bubblers which are made of gas supply tubes for supplying a water-molecules supply gas B11 as air bubbles into the glass melt G as shown in FIGS. 1 and 2. The first bubblers 20a-20d protrude from the bottom 11a of the melting furnace 11 upwardly in the vertical direction and are disposed side by side in the width direction of the melting furnace 11.

The first bubblers 20a, 20b, 20c and 20d have first ejection ports 24a, 24b, 24c and 24d formed in upper ends in the vertical direction to eject the water-molecules supply gas B11. There is no particular limitation to the shape of the first ejection ports 24a-24d. For example, the first ejection ports are formed in a circular shape in the embodiment.

The first ejection port 24a, 24b, 24c and 24d are disposed at first positions P11, P12, P13 and P14 in the glass melt G, respectively, as shown in FIGS. 2 and 3. The first positions P11-P14 are positions away from both of the inner surface 11d of the upstream wall 11b and the inner surface 11e of the downstream wall 11c of the melting furnace 11. In the embodiment, the first positions P11-P14 are in the vicinity of a hot spot.

The hot spot is a position where the glass melt G has a highest temperature in the flowing direction thereof in the melting furnace 11. The temperatures of the glass melt G in the melting furnace 11 are distributed so as to have the highest value in the vicinity of the center in the flowing direction and low values in areas upstream and downstream in the flowing direction. Accordingly, the hot spot is in the vicinity of the center of the glass melt G in the flowing direction in the melting furnace 11.

The glass melt G ascends upward in the vertical direction in the hot spot while the glass melt G descends downward in the vertical direction in the upstream and downstream areas of the hot spot. Thus, convection currents LF and UF are generated in the glass melt G.

In Description, the vicinity of the hot spot means to be a range where the distance from the hot spot is e.g. at most ⅕ the length of the melting furnace 11 in the flowing direction.

In the embodiment, the first position P11 is present in a portion of the glass melt G close to the bottom 11a of the melting furnace 11 as shown in FIG. 1. This is also applicable to each of the remaining first positions P12-P14.

In Description, the portion of the glass melt G close to the bottom 11a of the melting furnace 11 means a portion of the glass melt G closer to the bottom 11a than the center of the depth of the glass melt G in the vertical direction.

In Description, the positions of the first ejection ports 24a-24d mean positions where the centers of the first ejection ports 24a-24d in the flowing direction of the glass melt G are located, respectively, while the centers of the first ejection ports 24a-24d in the width direction of the melting furnace 11 are located, respectively. In other words, in the embodiment, the positions of the first ejection ports 24a-24d mean positions where the centers of the first ejection ports 24a-24d are located.

In Description, the wording "water-molecules supply gas" means a gas capable of eventually supplying water-molecules ($H_2O$) in the glass melt G with or without reaction. In short, the water-molecules supply gas may be a gas containing steam ($H_2O$) or a gas containing at least two kinds of gases which are capable of reacting in the glass melt G to produce $H_2O$. In other words, the water-molecules supply gas may be a gas containing hydrogen atoms. The water-molecules supply gas may further contain atoms other than hydrogen atoms or oxygen atoms.

The gas containing steam may be a gas prepared by mixing steam with one or more kinds selected from He gas, Ne gas, Ar gas, $N_2$ gas, $O_2$ gas and $CO_2$ gas. In this case, the steam has a partial pressure of preferably at least 0.5 atmospheric pressure. In order to reduce the generation of dew condensation in the tubes, the partial pressure of the steam may be set at at most 0.8 atmospheric pressure.

The gas containing one or more kinds of gases to supply water-molecules by reaction may be a mixed gas of $O_2$ and at least one kind selected from hydrocarbon gases, such as $H_2$ gas, $CH_4$ gas, $C_2H_6$ gas, $C_3H_8$ gas or $H_4H_{10}$ gas. The gas for supplying water-molecules by reaction may be mixed with one or more kinds selected from He gas, Ne gas, Ar gas, $N_2$ gas, and $CO_2$ gas.

Figure 4:
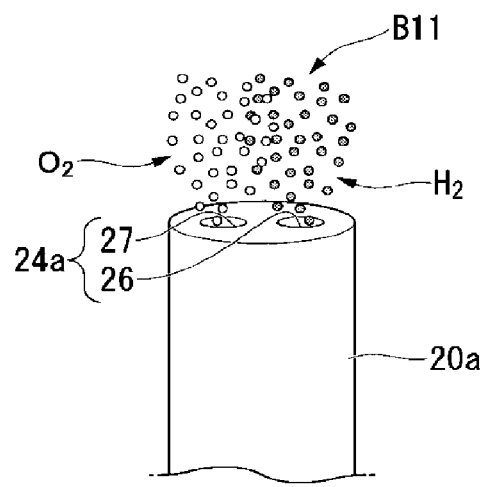
FIG. 4 is an enlarged view showing a bubbler according to the embodiment.

In the embodiment, the water-molecules supply gas B11 ejected from the first ejection port 24a of the first bubbler 20a as shown in FIG. 4 is a gas containing a hydrogen gas ($H_2$) and an oxygen gas ($O_2$) for example. In the embodiment, the first ejection port 24a of the first bubbler 20a includes an ejection port for hydrogen 26 and an ejection port for oxygen 27. The ejection port for hydrogen 26 ejects $H_2$ while the port for oxygen 27 ejects $O_2$. Thus, the first ejection port 24a of the first bubbler 20a ejects the water-molecules supply gas B11 containing $H_2$ and $O_2$. In the ejected water-molecules supply gas B11, $H_2$ and $O_2$ react to produce $H_2O$. This is also applicable to the remaining three first bubblers 20b-20d.

The first bubblers 20a-20d may be made of platinum, a platinum alloy, such as platinum-rhodium alloy, SUS, alumina or a ceramic material, such as zirconia, for example.

For example, when SUS is selected as the material for the first bubblers 20a-20d, the first bubblers 20a-20d may be water-cooled bubblers having a double tube structure.

[Second Bubblers]

The second bubblers 21a-21c are bubblers which are made of gas supply tubes for supplying a water-molecules supply gas B21 as air bubbles into the glass melt G as shown in FIGS. 1 and 2. The second bubblers 21a-21c protrude from the bottom 11a of the melting furnace 11 upward in the vertical direction and are disposed side by side in the width direction of the melting furnace 11.

The second bubblers 21a, 21b and 21c have second ejection ports 25a, 25b and 25c formed in upper ends in the vertical direction, respectively. There is no particular limitation to the shape of the second ejection ports 25a-25c. For example, the second ejection ports are formed in a circular shape in the embodiment.

The second ejection ports 25a, 25b and 25c are disposed at second positions P21, P22 and P23 in the glass melt G, respectively, as shown in FIGS. 2 and 3. The second positions P21-P23 are present at positions closer to the inner surface 11d than the center of the distance from the inner surface 11d of the upstream wall 11b to the first positions P11-P14 in the flowing direction of the glass melt G.

As shown in FIG. 1, the second position P21 is disposed in a portion of the glass melt G close to the bottom 11a of the melting furnace 11 in the embodiment. This is also applicable to the second positions P22 and P23.

In the embodiment, each of the second ejection ports 25a-25c of the second bubblers 21a-21c has two ejection ports as in the first ejection port 24a of the first bubbler 20a such that the two ejection ports eject $H_2$ and $O_2$, respectively. In other words, the water molecular supply gas B21 ejected from the second ejection ports 25a-25c of the second bubblers 21a-21c is a gas containing $H_2$ and $O_2$ in the embodiment.

In the embodiment, the entire water-molecules supply gas B21, which is ejected from the second ejection ports 25a-25c of the second bubblers 21a-21c, has a smaller floating force than the entire water-molecules supply gas B11, which is ejected from the first ejection ports 24a-24c of the first bubblers 20a-20c.

The wording "floating force" means a volume force that the bubbles of a water-molecules supply gas ejected into the glass melt exert by floating upward in the vertical direction to impart a force on the glass melt G upward in the vertical direction. In other words, the wording "floating force" means a force, by which the bubbles of a water-molecules supply gas press up the glass melt G upward in the vertical direction. The floating force F of a water-molecules supply gas is defined according to the following formulas (1) to (3):

$$F = \frac{1}{2} C_d \rho \frac{\pi d^2}{4} u^2 \quad (1)$$

$$C_d = \frac{16}{R_e} + \frac{8}{3} \quad (2)$$

$$R_e^2 + 6R_e - \frac{1}{2} \frac{gd^3}{v^2} = 0 \quad (3)$$

Cd is a drag coefficient. $\rho$ is a density of the glass melt G. d is the diameter of a bubble of a water-molecules supply gas, i.e. a foam diameter. u is a relative speed of the bubbles of the water-molecules supply gas in the vertical direction with respect to the speed of the glass melt G in the vertical direction. Re is Reynolds number. g is a gravitational acceleration. $v$ is a coefficient of kinematic viscosity. The relative speed u is a terminal velocity V that is a constant speed obtained by causing the floating force F and the gravity to balance in the glass melt G.

The terminal speed V may be found according to the following Stokes formula (4):

$$V = \frac{d^2(\rho - \rho_f)g}{18v} \quad (4)$$

$\rho_f$ is the density of a water-molecules supply gas.

The above-mentioned formulas (1) to (4) reveal that the floating force F increases as the foam diameter d of a water-molecules supply gas increases. It is also revealed that the floating force F increases as the coefficient of kinematic viscosity $v$ of the glass melt G reduces. Since the floating force F found according to the above-mentioned formulas (1) to (4) is the force produced for per one bubble, the entire water-molecules supply gas has a larger floating force as the ejection amount of the ejected water-molecules supply gas increases.

It should be noted that the ejection amount of the water-molecules supply gas is the supply amount of the water-molecules supply gas supplied into the glass melt G.

In the embodiment, there are no limitation to the water-molecules supply gases B11 and B21 ejected from the respective ejection ports as long as the entire water-molecules supply gas B21, which is ejected from the second bubblers 21a-21c, has a smaller floating force F than the entire water-molecules supply gas B11, which is ejected from the first bubblers 20a-20d.

In the embodiment, the first bubblers 20a-20d are disposed in a larger number than the second bubblers 21a-21c. By this arrangement, the entire water-molecules supply gas B21 ejected from the second bubblers 21a-21c can be provided with a smaller floating force F than the entire water-molecules supply gas B11 ejected from the first bubblers 20a-20d by setting the floating force F of the water-molecules supply gas ejected from the respective bubblers at the same value, for example.

The floating force F of the water-molecules supply gas B21 ejected from the second bubblers 21a-21c may be set at a smaller value than the floating force F of the water-molecules supply gas B11 ejected from the first bubblers 20a-20d.

The floating force F of the water-molecules supply gas B21 ejected from the second bubblers may be set to be smaller than the floating force F of the water-molecules supply gas B11 ejected from the first bubblers with the number of the first bubblers being equal to the number of the second bubblers, for example.

There is no particular limitation to the method for controlling the magnitude of the floating force F. For example, the amount of ejection may be controlled, the foam diameter d may be controlled, or the coefficient of kinematic viscosity $v$ may be controlled, for example. The method for controlling the coefficient of kinematic viscosity $v$ may be, for example, a method wherein first burners 60a-60e and second burners 61a-61e, which will be described later, are controlled, respectively, to control the temperatures of a portion of the glass melt G above the first bubblers 20a-20d and a portion of the glass melt G above the second bubblers 21a-21c. The coefficient kinematic viscosity of the glass melt G reduces as the temperature of the glass melt G rises.

When the method for controlling the floating force F is a method for controlling the amount of ejection and the foam diameter d, it is simple to control the floating force F because it is sufficient to control only the bubblers.

It is preferred that the bubbles generated by the water-molecules supply gases B11 and B21 have a smaller foam diameter d. As the foam diameter d reduces, the water-molecules supply gases B11 and B21 are more likely to be absorbed in the glass melt G, and the blocking of the convection of the glass melt G can be minimized. When the foam diameter d reduces, the floating force F reduces. In such a case, it is preferred to control the floating force F by increasing the ejection amount of the water-molecules supply gases B11 and B21.

It should be noted that the foam diameter d of the bubbles of the water-molecules supply gas ejected from the respective bubblers means the average value of countless bubbles ejected from the respective bubblers, and the floating force F of the water-molecules supply gas ejected from the respective bubblers means the average value of the floating forces generated by the bubbles of the water-molecules supply gas ejected from the respective bubblers.

In the embodiment, as shown in FIG. 3, an installation zone AR1, where it is acceptable to dispose the ejection ports of bubblers, is provided in the glass melt G upstream a centerline C that passes through the center of the distance from the inner surface 11d of the upstream end 11b to the respective first positions P11-P14 in the flowing direction of the molten glass G. The installation zone AR1 is located between the centerline C and the inner surface 11d of the upstream end 11b in planar view, i.e. the X-Y plane view of FIG. 3. The installation zone AR1 contains the second positions P21-P23.

In the embodiment, a non-installation zone AR2 and a non-installation zone AR3 are disposed downstream the installation zone AR1.

The non-installation zone AR2 is provided between the center line C and an imaginary line L1 passing through the first positions P11-P14 in a planar view. The non-installation zone AR2 is a zone where no bubbler ejection ports are provided in the molten glass G. In other words, no water-molecules supply gas is supplied into a portion of the glass melt G in the non-installation zone AR2.

The non-installation zone AR3 is disposed between the imaginary line L1 and the inner surface 11e of the downstream end 11c in planar view. The non-installation zone AR3 is a zone where no bubbler ejection ports are disposed in the glass melt G as in the non-installation zone AR2. In other words, in the non-installation zone AR3, no water-molecules supply gas is supplied into the glass melt G.

The absence of bubbler ejection ports in a non-installation zone means that the positions of ejection ports, i.e. the centers of the ejection ports are not located in a non-installation zone in the embodiment, and that an ejection port is not entirely located in a non-installation zone. In other words, it is acceptable that an ejection port partly protrudes in a non-installation zone as long as the center of an ejection port is not located in a non-installation zone.

In Description, no supply of a water-molecules supply gas in a portion of the glass melt G in a non-installation zone means that no ejection port disposed in a non-installation zone ejects a water-molecules supply gas. It is acceptable that an ejected water-molecules supply gas enters a non-installation zone, and that when the ejection port of a bubbler disposed at any one of the positions P11-P14 or in the installation zone AR1 partly protrudes into a non-installation zone, a water-molecules supply gas is ejected from the protruded part.

[First Heater and Second Heater]

The first heater 40 and the second heater 41 are disposed side by side in the width direction of the melting furnace 11 as shown in FIG. 3. The first heater 40 includes a first regenerative furnace 50, and first burners 60a, 60b, 60c, 60d and 60e. The second heater 41 includes a second regenerative furnace 51, and second burners 61a, 61b, 61c, 61d and 61e.

Each of the first regenerative furnace 50 and the second regenerative furnace 51 has a box structure which extends in the longwise direction of the melting furnace 11. In the embodiment, each of the first regenerative furnace 50 and the second regenerative furnace 51 is made of bricks. The heat of the atmosphere in the interior space of each of the first regenerative furnace 50 and the second regenerative furnace 51 is stored by the bricks as the build material.

It should be noted that the first regenerative furnace 50 and the second regenerative furnace 51 correspond to the regenerative furnace defined in Claims.

The first regenerative furnace 50 and the second regenerative furnace 51 have an opening 52 and an opening 53 formed at one end thereof in the longwise direction to communicate the interior spaces thereof with outside, respectively.

The first regenerative furnace 50 has a wall close to the melting furnace 11, to which the first burners 60a-60e are connected side by side in the longwise direction. The second regenerative furnace 51 has a wall close to the melting furnace 11, to which the second burners 61a-61e are connected side by side in the longwise direction. The inside of the first regenerative furnace 50 and the inside of the second regenerative furnace 51 communicate with the inside of each of the first burners 60a-60e and the inside of each of the second burners 61a-61e, respectively.

The first burners 60a-60e and the second burners 61a-61e are air combustion burners. The first burners 60a-60e and the second burners 61a-61e eject combustion flame to heat the inside of the melting furnace 11 so as to melt the raw glass material G0. The first burners 60a-60e have ejection ports disposed in a side wall 11f of the melting furnace 11 facing the space D in the melting furnace 11. The second burners 61a-61e have ejection ports disposed in a side wall 11g of the melting furnace 11 facing the space D in the melting furnace 11. By this arrangement, the inside of the first regenerative furnace 50 and the inside of the second regenerating furnace 51 communicate with the space D through the inside of the first burners 60a-60e and the inside of the second burners 61a-61e, respectively.

It should be noted that the first burners 60a-60e and the second burners 61a-61e correspond to the burner defined in Claims.

A group of the first burners 60a-60e and a group of the second burners 61a-61e alternately eject combustion flame to heat the inside of the melting furnace 11. FIG. 3 shows a case where combustion flame is ejected from the first burners 60a-60e. In this case, air as a combustion gas is supplied into the first regenerative furnace 50 through the opening 52. The air supplied into the first regenerative furnace 50 is supplied to the first burners 60a-60e. The exhaust gas generated by the combustion flame of the first burners 60a-60e flows into the second regenerative furnace 51 through the inside of the second burners 61a-61e, followed by being exhausted outside. In that time, the exhausted gas flowing into the second generative furnace 51 heats the second regenerative furnace 51. In other words, the second regenerative furnace 51 stores the heat in the melting furnace 11.

When a certain period of time has passed, the air as the combustion gas, now, flows into the inside of the second generative furnace 51 through the opening 53, and the second burners 61a-61e eject combustion flame. In that time, the air flowing into the second regenerative furnace 51 is preheated since heat storage has been carried out in the second regenerative furnace 51 by the exhaust gas generated by the first burners 60a-60e. Thus, it is possible to improve the utilization efficiency of combustion heat generated by the first burners 60a-60e and the second burners 61a-61e.

[Vacuum Degassing Apparatus]

As shown in FIG. 1, the vacuum degassing apparatus 12 is disposed downstream of the melting furnace 11. The vacuum degassing apparatus 12 is a so-called portal vacuum degassing apparatus. The vacuum degassing apparatus 12 includes a refiner 14, an uprising pipe 13, a downfalling pipe 15, connecting paths 16 and 17, and an unshown depressurization system.

The refiner 14 is made of, e.g. refractory bricks in the embodiment. The refiner 14 has a hollow structure having an interior space surrounded by refractory bricks. The refractory bricks may be burned refractories, unburned refractories or electrocast refractories.

In the interior space of the refiner 14, a flow path for the glass melt G is formed so as to extend in one direction. The direction the extending direction of the flow path for the glass melt G is the X-axis direction in the embodiment.

The uprising pipe 13 is connected to an upstream end of the refiner 14 form downward in the vertical direction. The uprising pipe 13 extends in the vertical direction. The inside of the uprising pipe 13 communicates with the flow path of the refiner 14. The uprising pipe 13 has a lower end in the vertical direction connected to the melting furnace 11 through the connection path 16. The uprising pipe 13 sucks the glass melt G in an unrefined state from the melting furnace 11 and supplies the unrefined glass melt to the flow path in the refiner 14. There is no specific limitation to the cross-sectional shape of the uprising pipe 13. The uprising pipe may be rectangular in section, for example.

The downfalling pipe 15 is connected to a downstream end of the refiner 14 from downward in the vertical direction. The downfalling pipe 15 extends in the vertical direction. The inside of the downfalling pipe 15 communicate with the flow path of the refiner 14. The downfalling pipe 15 has a lower end in the vertical direction connected to the forming apparatus 500 through the connection path 17. The glass melt G, which has been refined by the refiner 14, is discharged downward in the vertical direction from the flow path in the refiner 14 through the downfalling pipe 15. There is no particular limitation to the cross-sectional shape of the downfalling pipe 15. The downfalling pipe may be rectangular in section, for example.

The unshown depressurization system is a system for depressurizing the inside of the flow path of the refiner 14. There is no particular limitation to the depressurization system as long as the system can depressurize the inside of the flow path. The depressurization system may be, for example, a vacuum housing for accommodating the refiner 14. In that case, the inside of the vacuum housing can be depressurized and evacuated to place the inside of the flow path of the refiner 14 in a depressurized state of lower than atmospheric pressure. As another depressurization system, e.g. a vacuum pump may be employed to depressurize and evacuate a space in the refiner 14 above the glass melt G without disposing such a vacuum housing.

<Process for Producing Glass Product>

Now, the process for producing a glass product according to the embodiment will be described.

Figure 5:
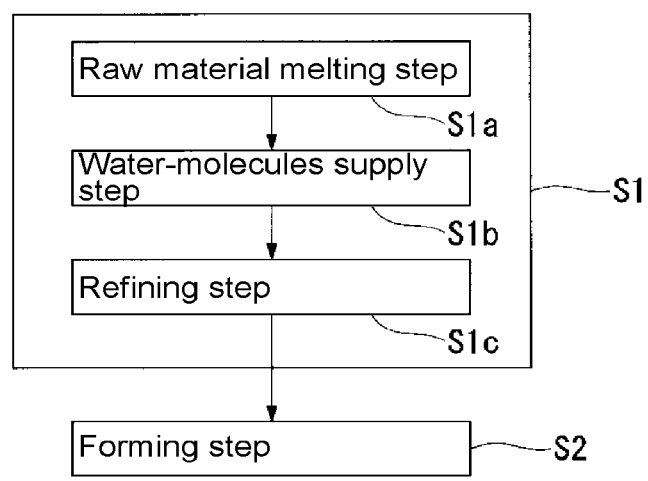
FIG. 5 is a flowchart showing a procedure for the process for producing a glass product according to the embodiment of the present invention.

The process for producing a glass product according to the embodiment includes a molten glass producing step S1 and a forming step S2 as shown in FIG. 5.

In Description, the molten glass producing step S1 corresponds to the process for producing molten glass defined in Claims.

[Process for Producing Molten Glass]

The molten glass producing step S1 includes a raw material melting step S1$a$, a water-molecules supply step S1$b$ and a refining step S1$c$. In the following explanation, the molten glass producing step S1 will be described about a case where the apparatus for producing molten glass 10 according to the embodiment is employed.

The raw material melting step S1$a$ is a step for melting the raw glass material G0 to produce the glass melt G. The raw glass material G0 is introduced, through the raw glass material supply port 18, into the melting furnace 11, which is heated by the first burners 60$a$-60$e$ and the second burners 61$a$-61$e$. In this step, the raw glass material G0 is molten to produce the glass melt G.

The water-molecules supply step S1$b$ is a step for employing the first bubblers 20$a$-20$d$ and the second bubblers 21$a$-21$c$ to supply the water-molecules supply gases B11 and B21 in the glass melt G, which flows from the inner surface 11$d$ of the upstream wall 11$b$ to the inner surface 11$e$ of the downstream wall 11$c$ in the melting furnace 11. The supply position for supplying the water-molecules supply gases in the water-molecules supply step S1$b$ includes the first positions P11-P14 with the first ejection ports 24$a$-24$d$ disposed and the second positions P21-P23 with the second ejection ports 25$a$-25$c$ disposed form downstream to upstream in the flowing direction of the glass melt G in this order.

As described above, the water-molecules supply gases B11 and B21 are ejected into the glass melt G such that the entire water-molecules supply gas B21, which is ejected from the second ejection ports 25$a$-25$c$ of the second bubblers 21$a$-21$c$, is set have a smaller floating force than the entire water-molecules supply gas B11, which is ejected from the first ejection ports 24$a$-24$c$ of the first bubblers 20$a$-20$c$.

Since the first ejection ports 24$a$-24$d$ of the first bubblers 20$a$-20$d$ are disposed in the vicinity of the hot spot, the water-molecules supply gas B11 ejected from the first bubblers 20$a$-20$d$ generates two loops of convection currents, which circulate largely in the melting furnace 11. Specifically, as shown in FIG. 1, this arrangement generates an upstream convection current UF where the glass melt G rises from the vicinity of the hot spot, i.e. from the vicinity of the first bubblers 20$a$-20$d$ and moves upstream, and a downstream convection current LF where the glass melt G rises from the vicinity of the first bubblers 20$a$-20$d$ and moves downstream.

Bubbles created by the water-molecules supply gas B11 ejected from the first ejection ports 24$a$-24$d$ of the first bubblers 20$a$-20$d$ are absorbed into the glass melt G, which circulates in the melting furnace under the action of the upstream convection current UF and the downstream convection current LF.

On the other hand, bubbles created by the water-molecules supply gas B21 ejected from the second ejection ports 25$a$-25$c$ of the second bubblers 21$a$-21$c$ are absorbed into the glass melt G, which circulates in the melting furnace 11 under the function of the upstream convection current UF.

The ejection amount of the water-molecules supply gases B11 and B21 is determined based on a desired increase in the $H_2O$ content of the glass melt G. For example, when an attempt is made to increase the $H_2O$ content of the glass melt G by 100 ppm, the ejection amount of the entire water-molecules supply gases B11 and B21 may be set to be at least 100 $Nm^3$ and at most 5,000 $Nm^3$ with respect to 1 kg of glass melt G, for example.

As the $H_2O$ content in the glass melt G increases, it is more easily possible to degas the bubbles in the glass melt G in the refining step S1$c$. From this point of view, it is preferred to control the $H_2O$ content of the glass melt G at a sufficiently high value. Specifically, the $H_2O$ content of the glass melt G is preferably at least 0.025 wt %, more preferably at least 0.035 wt %, further preferably a saturation $H_2O$ content in the glass melt G. The saturation $H_2O$ content in the glass melt G is, for example, at least about 0.03 wt % and about at most 0.1 wt % when the glass melt G has a temperature of at least about 1,000° C. and at most about 1,800° C.

In this step, the water-molecules supply gases B11 and B21 are supplied in the glass melt G to increase the $H_2O$ content in the glass melt G. The glass melt G is discharged from the melting furnace 11 through the connection path 19. The discharged glass melt G flows into the vacuum degassing apparatus 12.

Next, the refining step S1$c$ is a step for degassing, under a reduced pressure atmosphere, the glass melt G, which has flowed out of the downstream wall 11$c$ of the melting furnace 11 through the connection path 16. The glass melt G flowing into the vacuum degassing apparatus 12 is supplied to the refiner 14 through the uprising pipe 13. The glass melt G passes through the refiner 14 in such a state that the inside of the refiner 14 is depressurized by the unshown depressurization system.

The glass melt G passes through the refiner 14 under such a depressurized state, resulting in a significant growth of the bubbles in the glass melt G. The grown bubbles rise onto a glass level Gb of the glass melt G and are broken.

In this step, bubbles in the glass melt G are removed by the refiner 14. In other words, the glass melt G is refined by the refiner 14.

By the procedure from the raw material melting step S1$a$ to the refining step S1$c$, the molten glass producing step S1 ends to produce molten glass.

In Description, the wording "glass melt" means molten glass that is refined in the refining step S1c after the raw glass material G0 is molten in the raw material melting step S1a.

In Description, the wording "molten glass" means molten glass that is placed in a state to be ready to produce a glass product by forming operation.

It should be noted that the state to be ready to produce a glass product by forming operation refers to not only a case where the water-molecules supply step S1b and the refining step S1c are both carried out in connection with the molten glass G but also a case where the above-mentioned steps are partly omitted in connection with the glass melt G or a case where another step is carried out in connection with the glass melt G.

Next, the forming step S2 is a step where the forming apparatus 500 is employed to form the resulting molten glass in a desired shape to produce a glass product.

Thus, the glass product is produced through the molten glass producing step S1 and the forming step S2 as mentioned above.

It should be noted that after the forming step S2, an annealing step for annealing a formed glass product, a cutting step for cutting annealed glass in required lengths, or a polishing step for polishing the resulting cut glass may be carried out. The glass product may be glass melt or formed glass during the course of the annealing step, or formed glass that is subjected to processing, such as surface treatment or has a film applied thereto after the annealing step and the cutting step are completed.

In accordance with the embodiment, it is easy to increase the $H_2O$ content in glass melt with excessive generation of convection of the glass melt being reduced because the second ejection ports 25a-25c of the second bubblers 21a-21c are disposed in the installation zone AR1. The operation will be described in details.

When the bubbles in a glass melt G is degassed by vacuum degassing, it is preferred that the glass melt G contains a large amount of $H_2O$. Because the gas component of H2O dissolved in the glass melt G enters quite rapidly in bubbles in the glass melt G that are developing under a reduced pressure atmosphere, the bubbles develop in large sizes, easily floating on a glass level Gb in the refiner 14.

As the method for increasing the $H_2O$ content in the glass melt G, a method for supplying a water-molecules supply gas into the glass melt G by a bubbler may be, for example, selected as mentioned above.

Figure 8:
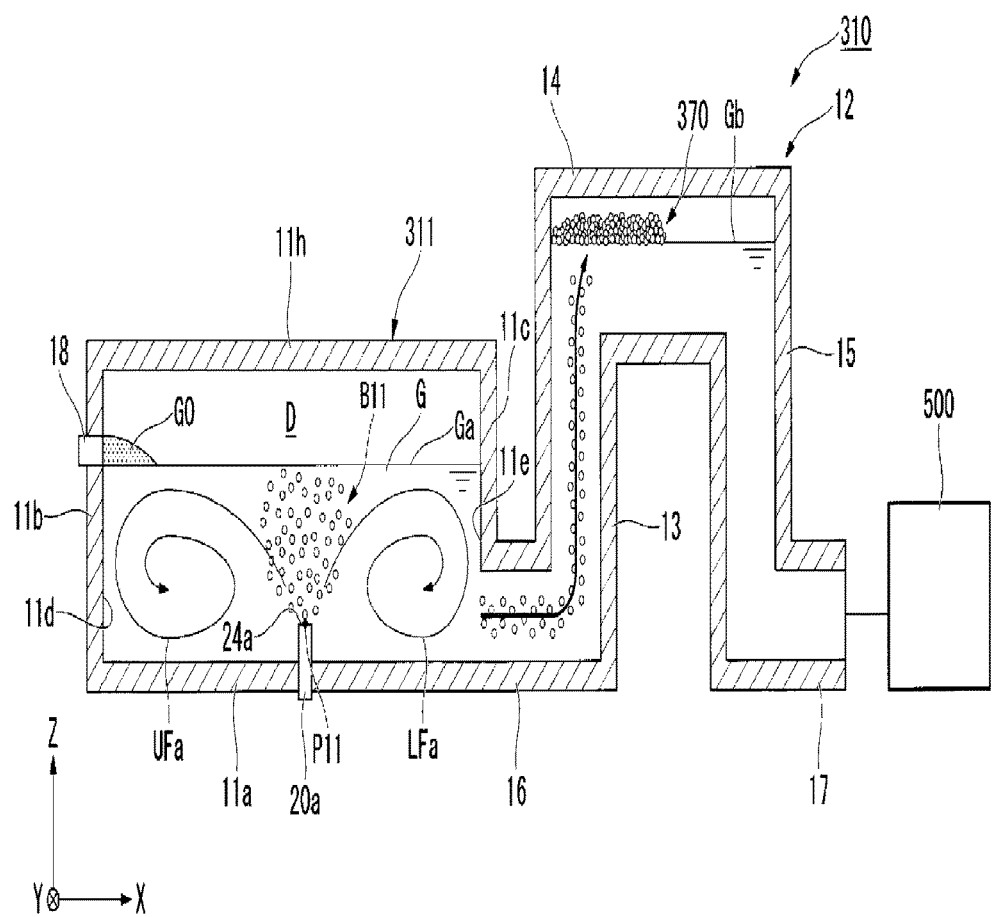
FIG. 8 is a schematic view showing the molten glass producing apparatus in a comparative example.

When an attempt is made to supply a large amount of $H_2O$ in the glass melt G so as to carry out a sufficient degassing operation in the refining step in e.g. a molten glass producing apparatus 310 which has only the first bubblers 20a-20d disposed in a melting furnace 311 as shown in FIG. 8, the floating force of the water-molecules supply gas B11 becomes, however, excessively large in some cases. In such cases, an upstream convection current UFa and a downstream convection current LFa circulate in an excessive speed.

When the convection currents of the glass melt G circulate in an excessive speed, bubbles of the water-molecules supply gas B11 enter the vacuum degassing apparatus 12 in some cases before the bubbles are absorbed in the glass melt G. In such cases, bubbles of the water-molecules supply gas B11 stay on a glass level Gb in the refiner 14 to form a bubble layer 370 in some cases. When the bubble layer 370 is formed, the pressure loss in the flow path of the refiner 14 increases, causing a problem in that the glass melt G cannot flow in the flow path or a problem in that bubbles in the bubble layer 370 in contact with a top wall, a side wall or the like of the refiner 14 drop into the glass melt G to decrease the quality of the glass melt G.

Further, when the convection currents of the glass melt G circulate in an excessive speed, a portion of the glass melt G close to the glass level Ga in the melting furnace 11 heated by the first burners 60a-60e and the second burners 61a-61e circulates rapidly toward the bottom 11a of the melting furnace 11. Accordingly, the temperature of the bottom 11a increases, causing a problem in that the melting furnace 11 is deteriorated. Because it is likely to increase the temperature of the entire glass melt G to a high level, the kinematic viscosity ν of the glass melt G is significantly reduced to cause a problem that the glass melt G leaks from a joint when the melting apparatus 11 is made of bricks.

In an attempt is made to employ the first bubblers 20a-20d to increase the $H_2O$ content in the glass melt G, the floating force of the ejected water-molecules supply gas B11 is controlled such that the convection currents of the glass melt G do not become excessive as mentioned above. Even if such an attempt is made, it is, however, impossible to sufficiently increase the $H_2O$ content in the glass melt G in some cases. It has been difficult to sufficiently increase the ratio of $H_2O$ contained in the glass melt G with excessive generation of convection of the glass melt being reduced.

By contrast, in accordance with the embodiment, the second positions P21-P23 where the second ejection ports 25a-25c of the second bubblers 21a-21c are disposed are located in the installation zone AR1. In other words, the second positions P21-P23 are located at closer positions to the inner surface 11d of the upstream wall 11b than the center of the flowing direction of the glass melt G from the inner surface 11d to the first positions P11-P14 with the first ejection ports 24a-24d disposed. The installation zone AR1 is located at a position sufficiently away from the first positions P11-P14. By this arrangement, the bubbles of the water-molecules supply gas B21 ejected from the second ejection ports 25a-25c in the installation zone AR1 are difficult to enhance the upstream convection current UF and the downstream convection current LF generated by the first bubblers 20a-20d. Thus, in accordance with the embodiment, it is easy to sufficiently increase the $H_2O$ content in the glass melt G with excessive generation of convection currents of the glass melt G being reduced, by ejecting the water-molecules supply gas B21 from the second ejection ports 25a-25c instead of increasing the ejection amount of the water-molecules supply gas B11 ejected from the first ejection ports 24a-24d.

If the water-molecules supply gas is supplied between the installation zone AR1 and the first positions P11-P14 with the first ejection ports 24a-24d disposed, the upstream convection current UF and the downstream convection current LF generated by the first bubblers 20a-20d are likely to be enhanced since the first ejection ports 24a-24d are close to the second positions P21-P23 with the second ejection ports 25a-25c of the second bubblers 21a-21c disposed.

In contrast, in accordance with the embodiment, the non-installation zone AR2, where no bubbler ejection ports are disposed, is located between the installation zone AR1 and the first positions P11-P14 of the first ejection ports 24a-24d. By this arrangement, it is possible to more effectively reduce excessive generation of convection of the glass melt G.

If the water-molecules supply gas is supplied at a position downstream the first positions P11-P14 with the first ejection ports 24a-24d in the melting furnace 11, bubbles of the water-molecules supply gas are likely to enter the vacuum degassing apparatus 12 before being absorbed into the glass melt G.

In contrast, in accordance with the embodiment, the non-installation zone AR3, where no bubbler ejection ports are disposed, is located at a position downstream the first positions P11-P14 with the first ejection ports 24a-24d disposed in the melting furnace 11. By this arrangement, it is possible to reduce the entrance of the bubbles of the water-molecules supply gas into the vacuum degassing apparatus 12.

If the ejection amount of the water-molecules supply gas B21 ejected from the second ejection ports 25a-25c increases, the upstream convection current UF is likely to be disturbed because the floating force of the water-molecules supply gas B21 increases. If the upstream convection current UF is disturbed, the temperature of the bottom 11a reduces because a portion of the glass melt G close to the glass level Ga that is heated is difficult to circulate toward the bottom 11a. Accordingly, bubbles contained in the glass melt G are unlikely to be sufficiently removed because the temperature of the entire glass melt G drops to make it difficult to maintain a sufficient refining temperature in the refiner 14.

In contrast, in accordance with the embodiment, it is possible to reduce the disturbance to the upstream convection current UF because the floating force of the water-molecules supply gas B21 ejected from the second ejection ports 25a-25c is set to be smaller than the floating force of the water-molecules supply gas B11 ejected from the first ejection ports 24a-24d.

In accordance with the embodiment, the first ejection ports 24a-24d and the second ejection ports 25a-25c are located at positions in the glass melt G close to the bottom 11a of the melting furnace 11. By this arrangement, the bubbles of the ejected water-molecules supply gases B11 and B21 are likely to be absorbed in the glass melt G because of having a longer staying time in the glass melt G by a time required for rising from the positions close to the bottom 11a toward the glass level Ga in the glass melt G. Accordingly, in accordance with the embodiment, it is easy to increase the $H_2O$ content in the glass melt G.

In accordance with the embodiment, two loops of convection currents, i.e. the upstream convection current UF and the downstream convection current LF can be generated in the melting furnace 11 since the first ejection ports 24a-24d are located in the vicinity of the hot spot. The generation of such two loops of convection currents can extend the staying time of the glass melt G in the melting furnace 11. Thus, it is possible to increase the amount of $H_2O$ absorbed into the glass melt G.

The upstream convection current UF can reduce the flow of undissolved residues of the raw glass melt G0 downstream because of forming a flow directed to upstream on the glass level Ga. Thus, it is possible to reduce the phenomenon that the raw glass material G0 flows into the vacuum degassing apparatus 12 without being dissolved.

In the embodiment, the first burners 60a-60e and the second burners 61a-61e are air combustion burners. When the raw glass material G0 is dissolved by air combustion, the $H_2O$ content in produced glass melt G is usually reduced. In contrast, the embodiment is particularly effective for dissolving the raw glass material G0 by air combustion because of increasing the $H_2O$ content in the glass melt G.

In the embodiment, the first regenerative furnace 50 and the second regenerative furnace 51 are disposed. When air combustion is carried out, it is preferred to employ the first generative furnace 50 and the second regenerative furnace 51 to increase the utilization efficiency of heat from the viewpoint that the amount of heat exhausted into the melting furnace 11 is large.

It should be noted that the following structure and method may be adopted in the embodiment.

In the embodiment, there is no particular limitation to the second positions where the second ejection ports of the second bubblers are disposed as long as the second ports are located in the installation zone AR1. There is no particular limitation to the position where the main bodies of the second bubblers are disposed as long as the second ejection ports are located in the installation zone AR1. In the embodiment, other structures as shown in, e.g. FIGS. 6 and 7 may be adopted. Now, such other structures will be described in details.

It should be noted that members identical or similar to those explained above are denoted by identical reference numerals in these figures, and that explanation of such members will be omitted in some cases.

Figure 6:
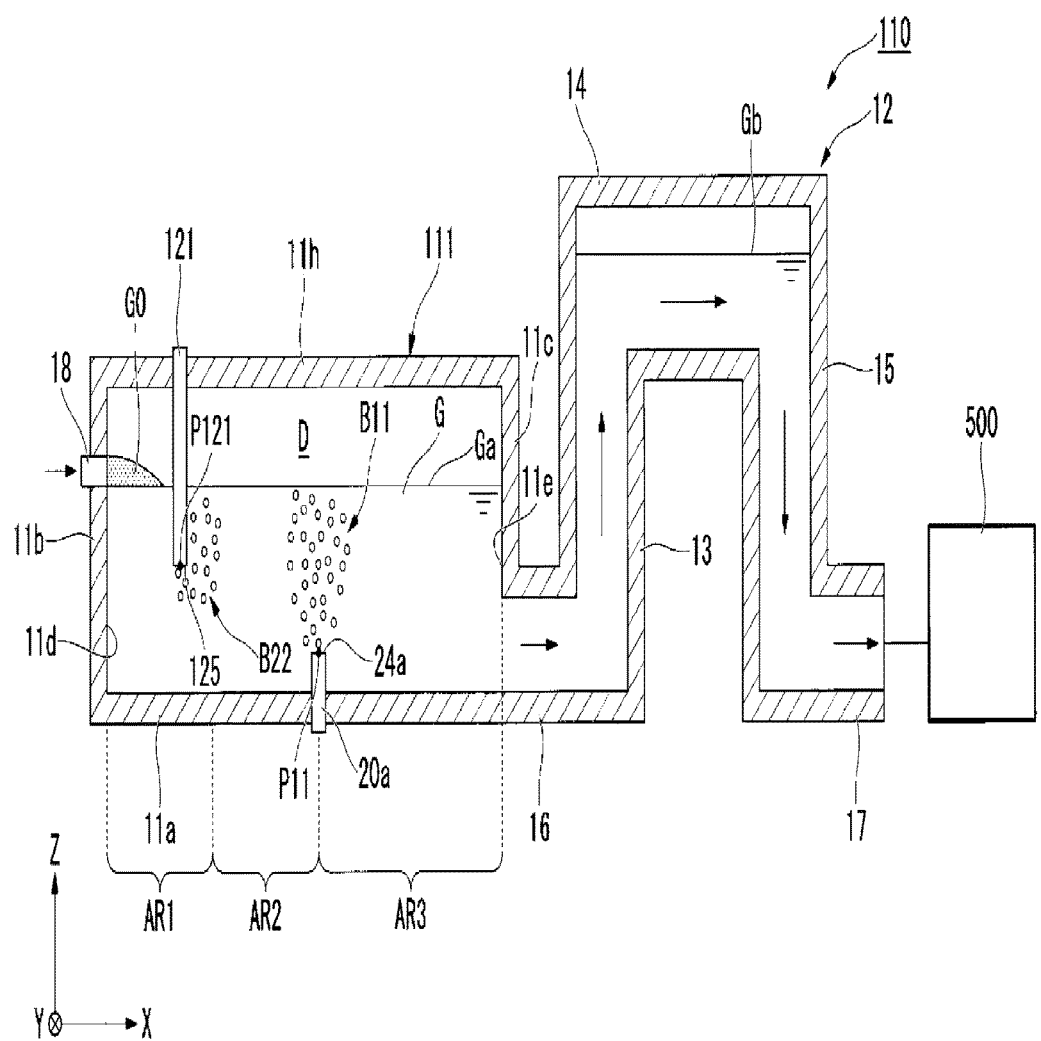
FIG. 6 is a schematic view showing the molten glass producing apparatus according to another embodiment of the present invention.

In the embodiment, second bubblers 121 may be disposed in a top wall 11h of a melting furnace 111 as in, e.g. the molten glass producing apparatus 110 as shown in FIG. 6. The second bubblers 121 are disposed so as to extend downward from the top wall 11h of the melting furnace 111 in the vertical direction to the inside of the glass melt G through a space D. The second bubblers 121 may be disposed in number of, e.g. 3 side by side in the width direction of the melting furnace 11 as in the second bubblers 21a-21c shown in FIG. 2.

The second bubblers 121 have second ejection ports 125 disposed on lower ends in the vertical direction, respectively. The water-molecules supply gas B22 is ejected from the second ejection ports 125. Each of the second ejection ports 125 is configured to include, e.g. two ejection ports as in the first ejection ports 24a-24d of the first bubblers 20a-20d. The second ejection ports 125 are disposed at second positions P121. The second positions P121 are located in a portion of the glass melt G close to the glass level Ga in the installation zone AR1.

In Description, the portion of the glass melt G close to the glass level Ga means a portion of the glass melt G closer to the glass level Ga than the center of the depth of the glass melt G in the vertical direction.

By this arrangement, it is possible to minimize the blocking of the convection currents of the glass melt G by the ejected water-molecules supply gas B22 since the second ejection ports 125 of the second bubblers 121 are located in the portion of the glass melt G close to the glass level Ga.

Figure 7:
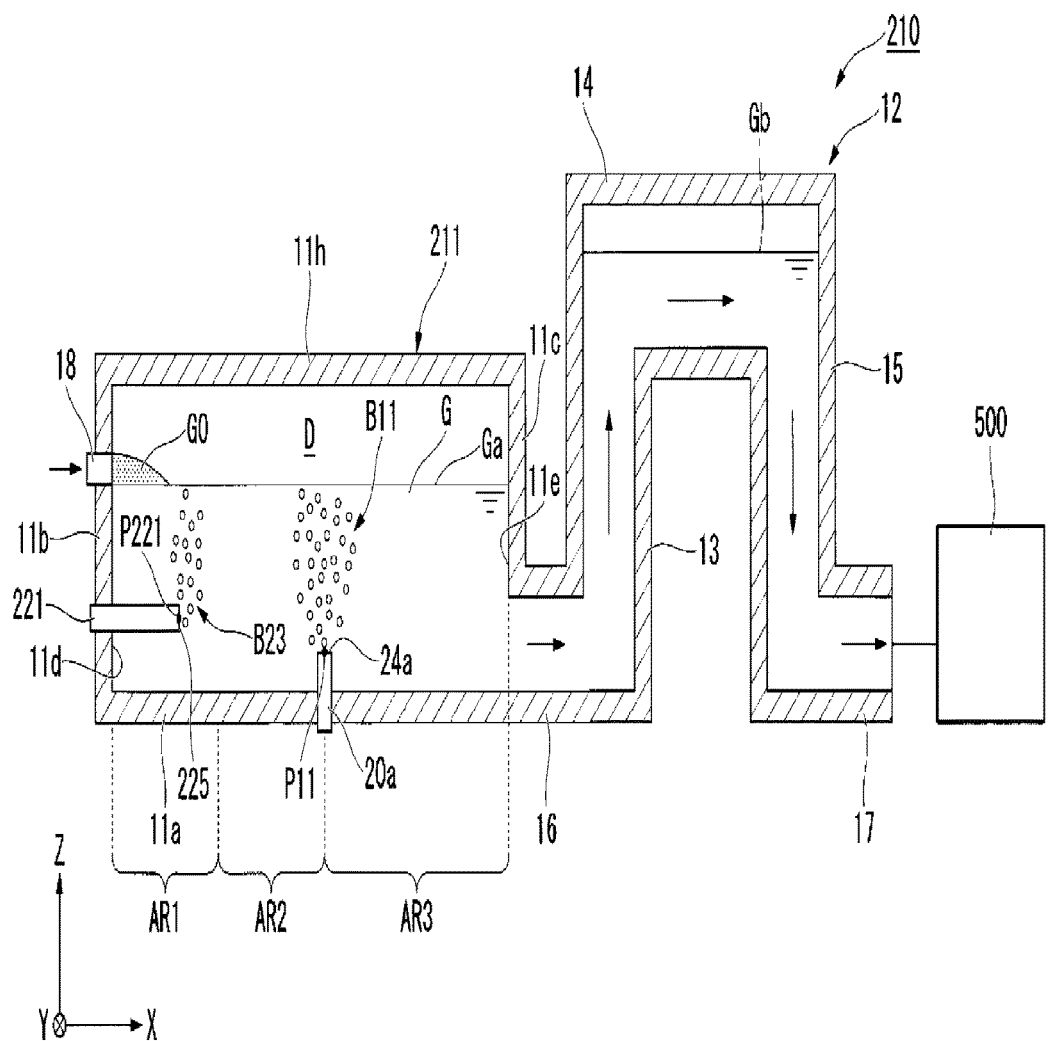
FIG. 7 is a schematic view showing the molten glass producing apparatus according to another embodiment of the present invention.

In the embodiment, second bubblers 221 may be disposed in an upstream wall 11b of a melting furnace 211 as in, e.g. the molten glass producing apparatus shown in FIG. 7. The second bubblers 221 are disposed so as to extend in the longwise direction of the melting furnace 211 from the upstream wall 11b toward the inside of the glass melt G. The second bubblers 221 are disposed in number of 3 side by side in the width direction of the melting furnace 211 as in, e.g. the second bubblers 21a-21c shown in FIG. 2.

The second bubblers 221 have second ejection ports 225 disposed at downstream ends, respectively. The second ejection ports 225 eject a water-molecules supply gas B23. Each of the second ejection ports 225 is configured to include, e.g. two ejection ports as in the first ejection ports 24a-24d of the first bubblers 20a-20d. The second ejection ports 225 are disposed at second positions P221. The second positions P221 are located a portion of the glass melt G close to the bottom 11a in the installation zone AR1.

By this arrangement, it is easy to control the ejection amount of the water-molecules supply gas B23 from the second ejection ports 225 of the second bubblers 221 according to, e.g. the amount of an introduced raw glass material G0 because the water-molecules supply gas B23 can be supplied from the same side as the raw glass material supply port 18 to the second bubblers 221.

In the embodiment, the main bodies of, e.g. the second bubblers 21a-21c may be disposed in the non-installation zone AR2 or AR3 as long as the second ejection ports 25a-25c are disposed in the installation zone AR1.

In the embodiment, steam may be supplied into the space D of the melting furnace 11 in the water-molecules supply step S1b. In other words, steam may be supplied into the space D in contact with the glass melt G in the melting furnace 11. By this arrangement, it is possible to increase the $H_2O$ content in the glass melt G.

In the embodiment, steam may be supplied the first regenerative furnace 50 and the second regenerative furnace 51 when a combustion gas is supplied to the first burners 60a-60e and the second burners 61a-61e through the first regenerative furnace 50 and the second regenerative furnace 51 in the raw material melting step S1a. By this arrangement, the steam is supplied into the inside of the melting furnace 11, i.e. the space D in the embodiment along with the combustion flames from the first burners 60a-60e and the second burners 61a-61e to increase the $H_2O$ content in the glass melt G. In this case, the combustion gas and the steam may be both supplied into the first regenerative furnace 50 and the second regenerative furnace 51, or the steam may be supplied into the first regenerative furnace 50 and the second regenerative furnace 51 before supply of the combustion gas.

Although the explanation has been made about a case where the first ejection port 24a of each of the first bubblers 20a is configured to include the hydrogen ejection port 26 and the oxygen ejection port 27 such that both of $H_2$ and $O_2$ can be ejected from the first ejection port 24a of each of the first bubblers 20a, the embodiment is not limited to such a case. In the embodiment, the bubblers may be disposed such that one of the bubblers ejects only $H_2$, and one of the others ejects only $O_2$ such that the gases ejected from the respective bubblers react in the glass melt G for example. This also applicable to the second bubblers 21a-21c.

In the embodiment, the water-molecules supply gas B11 ejected from the respective ejection ports of the first bubbles 20a-20d and the water-molecules supply gas B21 ejected from the respective ejection ports of the second bubblers 21a-21c may be the same as each other or different from each other in terms of kind and floating force F.

Although explanation has been made about a case where the first bubblers are configured to have the first bubblers 20a-20d disposed in number of 4 side by side in the width direction of the melting furnace 11, there is no limitation to the number of the first bubblers disposed in the width direction of the melting furnace 11 in the embodiment. The number of the first bubblers may be at most three or at least five.

Although explanation has been made about a case where the second bubblers are configured to have the second bubblers 21a-21c disposed in number of 3 side by side in the width direction of the melting furnace 11, there is no limitation to the number of the second bubblers disposed in the width direction of the melting furnace 11 in the embodiment as in the first bubblers. The number of the second bubblers may be at most two or at least four.

Although explanation has been made about a case where the second ejection ports 25a-25c of the second bubblers 21a-21c are configured to be disposed side by side in a single row in the width direction of the melting furnace 11 at the same position in the flowing direction of the glass melt G, the embodiment is not limited to such a case. In the embodiment, for example, the second bubblers may be disposed side by side in at least two rows in the width direction of the melting furnace 11, or the second bubblers may be disposed at different positions in the flow direction of the glass melt G.

Although explanation has been made about a case where the first ejection ports 24a-24c of the first bubblers 20a-20c are configured to be disposed side by side in a single row in the width direction of the melting furnace 11 at the same position in the flowing direction of the glass melt G, the embodiment is not limited to such a case. In the embodiment, for example, the first bubblers may be disposed side by side in at least two rows in the width direction of the melting furnace 11, or the first bubblers may be disposed at different positions in the flowing direction of the glass melt G.

In the embodiment, the melting furnace 11 and the refiner 14 are not limited to be made of bricks and may be made of platinum or a platinum alloy for example.

In the embodiment, the vacuum degassing apparatus 12 may be a horizontally-placed vacuum degassing apparatus.

In the embodiment, there is no particular limitation to the method for dissolving the raw glass material G0. The raw glass material may be dissolved by, e.g. oxygen combustion other than the above-mentioned air combustion.

In the embodiment, the first regenerative furnace 50 and the second regenerative furnace 51 may be omitted.

INDUSTRIAL APPLICABILITY

In accordance with the present invention, it is possible to provide a process for producing molten glass, which is capable of easily increasing the $H_2O$ content in glass melt with excessive generation of convection of the glass melt being reduced, a process for producing a glass product by use of the process for producing molten glass, and an apparatus for producing the molten glass.

REFERENCE SYMBOLS 10, 110, 210 and 310: molten glass producing apparatus, 11, 111, 211 and 311: melting furnace, 11a: bottom, 11d: inner surface (upstream end), 11e: inner surface (downstream end), 12: vacuum degassing apparatus, 13: uprising pipe, 14: refiner, 15: downfalling pipe, 20a, 20b, 20c and 20d: first bubbler, 21a, 21b, 21c, 121 and 221: second bubblers, 24a, 24b, 24c and 24d: first ejection port, 25a, 25b, 25c, 125 and 225: second ejection port, 50: first regenerative furnace (regenerative furnace), 51: second regenerative furnace (regenerative furnace), 60a, 60b, 60c, 60d and 60e: first burner (burner), 61a, 61b, 61c, 61e and 61e: second burner (burner), B11, B21, B22 and B23: water-molecules supply gas, D: space, G: glass melt, G0: raw glass material, Ga and Gb: glass level, P11, P12, P13 and P14: first position, P21, P22, P23, P121 and P221: second position, S1: molten glass producing step (in method for producing molten glass), S1a: raw material melting step, S1b: water-molecules supply step, S1c: refining step, S2: forming step

What is claimed is:

1. A process for producing molten glass comprising:
   melting a raw glass material in a melting furnace to prepare glass melt;
   supplying a water-molecules supply gas into the glass melt flowing from an upstream end of the melting furnace toward a downstream end of the melting furnace; and
   degassing, under a reduced pressure atmosphere, the glass melt flowing out of the downstream end;
   wherein a position where the water-molecules supply gas is supplied in the water-molecules supply step includes a first position and a second position from downstream to upstream in a flowing direction of the glass melt in this order;
   the first position is a position away from both of the upstream end and the downstream end; and
   the second position is a position closer to the upstream end than a center of a distance between the upstream end and the first position in the flowing direction of the glass melt;
   wherein the water-molecules supply gas supplied at the second position has a smaller floating force than the water-molecules supply gas supplied at the first position.

2. The process according to claim 1, wherein the water-molecules supply gas supplied at each of the first position and the second position is ejected as bubbles by a bubbler; and the bubbles of the water-molecules supply gas supplied at the second position have a smaller bubble diameter than the bubbles of the water-molecules supply gas supplied at the first position.

3. The process according to claim 1, wherein the water-molecules supply gas supplied at the second position has a smaller supply amount than the water-molecules supply gas supplied at the first position.

4. The process according to claim 1, wherein no water-molecules supply gas is supplied between the first position and the center in the water-molecules supply step.

5. The process according to claim 1, wherein no water-molecules supply gas is supplied between the first position and the downstream end in the water-molecules supply step.

6. The process according to claim 1, wherein the first position is present close to a position where the glass melt has a highest temperature in the flowing direction of the glass melt and which is present in a portion of the glass melt close to the bottom of the melting furnace.

7. The process according to claim 1, wherein the second position is present in a portion of the glass melt close to the bottom of the melting furnace.

8. The process according to claim 1, wherein the second position is present in a portion of the glass melt close to a glass level.

9. The process according to claim 1, wherein steam is supplied in a space in contact with the glass melt when the water-molecules are supplied.

10. The process according to claim 1, wherein the raw glass material is made molten by air combustion when the water-molecules are supplied.

11. The process according to claim 1, wherein the melting furnace is equipped with a burner for ejecting combustion flame into the melting furnace; the burner is supplied with a combustion gas through a regenerative furnace for storing heat in the melting furnace; and steam is supplied to the regenerative furnace when the raw material is molten.

12. The process according to claim 1, wherein the water-molecules supply gas contains a gas having hydrogen atoms therein.

13. A process for producing a glass product, comprising:
    preparing molten glass by use of the molten glass producing process of claim 1; and
    forming the molten glass to produce a glass product.

* * * * *